US010976887B2

United States Patent
Hao et al.

(10) Patent No.: US 10,976,887 B2
(45) Date of Patent: Apr. 13, 2021

(54) METHOD AND APPARATUS FOR SPLIT-WINDOW DISPLAY

(71) Applicant: BEIJING XIAOMI MOBILE SOFTWARE CO., LTD., Beijing (CN)

(72) Inventors: Shaohua Hao, Beijing (CN); Zhenzhou Lu, Beijing (CN); Yin Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 106 days.

(21) Appl. No.: 15/935,244

(22) Filed: Mar. 26, 2018

(65) Prior Publication Data
US 2018/0284948 A1 Oct. 4, 2018

(30) Foreign Application Priority Data
Mar. 29, 2017 (CN) .......................... 201710200500.3

(51) Int. Cl.
*G06F 17/00* (2019.01)
*G06F 3/048* (2013.01)
(Continued)

(52) U.S. Cl.
CPC .......... *G06F 3/0481* (2013.01); *G06F 3/0482* (2013.01); *G06F 3/04886* (2013.01); *G06F 3/04812* (2013.01); *G06F 2203/04803* (2013.01)

(58) Field of Classification Search
CPC .......... G06F 3/0481; G06F 2203/04803; G06F 3/0482
(Continued)

(56) References Cited

U.S. PATENT DOCUMENTS 6,677,933 B1 * 1/2004 Yogaratnam ........ G06F 3/04886
345/174
9,182,937 B2 * 11/2015 Sirpal ................. G06F 3/1431
(Continued)

FOREIGN PATENT DOCUMENTS

| CN | 104978110 A | 10/2015 |
| CN | 106201166 A | 12/2016 |

(Continued)

OTHER PUBLICATIONS

Search report in corresponding European Patent Application No. 18163233.2, dated Jul. 27, 2018, 8 pages.
(Continued)

*Primary Examiner* — Manglesh M Patel
(74) *Attorney, Agent, or Firm* — Arch & Lake LLP

(57) ABSTRACT

A method and an apparatus are provided for split-window display. The method includes: entering a split-screen mode on a mobile terminal to display both a first display page for a first application and a second display page for a second application; detecting that an input mode for inputting information has been launched on the mobile terminal; determining whether the information is to be input in the first display page or the second display page; switching to a first display mode on the terminal in response to determining that the information is to be input in the first display page; and switching to a second display mode on the terminal in response to determining that the information is to be input in the second display page.

20 Claims, 10 Drawing Sheets

(51) Int. Cl.
*G06F 3/0481* (2013.01)
*G06F 3/0482* (2013.01)
*G06F 3/0488* (2013.01)

(58) Field of Classification Search
USPC .................. 715/200, 800, 796, 790, 797
See application file for complete search history.

(56) References Cited

U.S. PATENT DOCUMENTS

| | | | |
|---|---|---|---|
| 9,189,018 B2* | 11/2015 | Sirpal | H04M 1/0256 |
| 9,298,474 B2* | 3/2016 | Bauchot | G06F 9/451 |
| 9,454,304 B2* | 9/2016 | Hinckley | G06F 3/04883 |
| 10,209,858 B2* | 2/2019 | Yook | G06F 3/0481 |
| 10,394,377 B2* | 8/2019 | Kim | G06F 3/04886 |
| 10,684,867 B2* | 6/2020 | Liu | G06F 16/958 |
| 10,761,651 B2* | 9/2020 | Kim | G06F 3/0416 |
| 2006/0075359 A1* | 4/2006 | Bauchot | G06F 9/451 |
| | | | 715/790 |
| 2009/0187853 A1* | 7/2009 | Noyes | G06F 3/0481 |
| | | | 715/802 |
| 2011/0143769 A1* | 6/2011 | Jones | G06F 1/1624 |
| | | | 455/456.1 |
| 2011/0296333 A1* | 12/2011 | Bateman | G06F 3/04886 |
| | | | 715/773 |
| 2012/0005607 A1* | 1/2012 | Tofinetti | G06F 3/0483 |
| | | | 715/769 |
| 2013/0113742 A1* | 5/2013 | Jin | G06F 3/0481 |
| | | | 345/173 |
| 2013/0222296 A1* | 8/2013 | Paek | G06F 3/04883 |
| | | | 345/173 |
| 2015/0169099 A1* | 6/2015 | Lavallee | G06F 9/543 |
| | | | 345/173 |
| 2015/0185980 A1 | 7/2015 | An et al. | |
| 2016/0334989 A1* | 11/2016 | Liu | G06F 3/0488 |
| 2017/0031555 A1 | 2/2017 | Ma | |
| 2019/0073123 A1* | 3/2019 | Yang | G06F 3/0488 |
| 2020/0326839 A1* | 10/2020 | Walkin | G06F 3/04845 |

FOREIGN PATENT DOCUMENTS

| | | |
|---|---|---|
| CN | 106412237 A | 2/2017 |
| CN | 106537319 A | 3/2017 |
| WO | 2016118793 A1 | 7/2016 |

OTHER PUBLICATIONS

First Office Action to Chinese Patent Application No. 201710200500. 3, dated Aug. 29, 2019 and English translation, (18p).
Second Office Action to Chinese Patent Application No. 201710200500. 3, dated Jul. 6, 2020 and English translation, (14p).

* cited by examiner

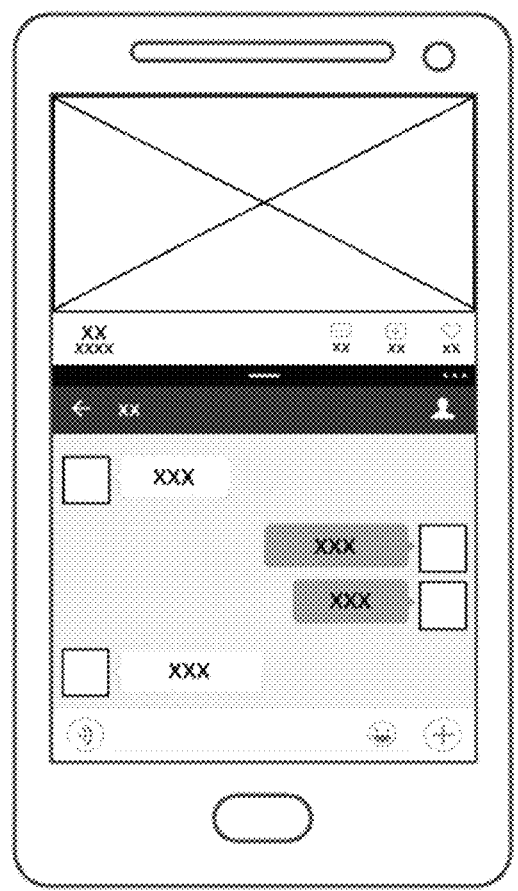 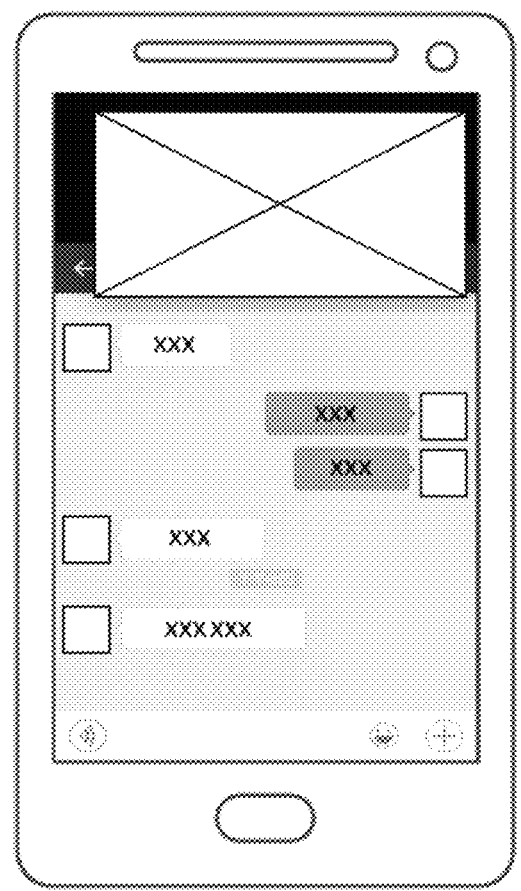
Fig. 4A  Fig. 4B
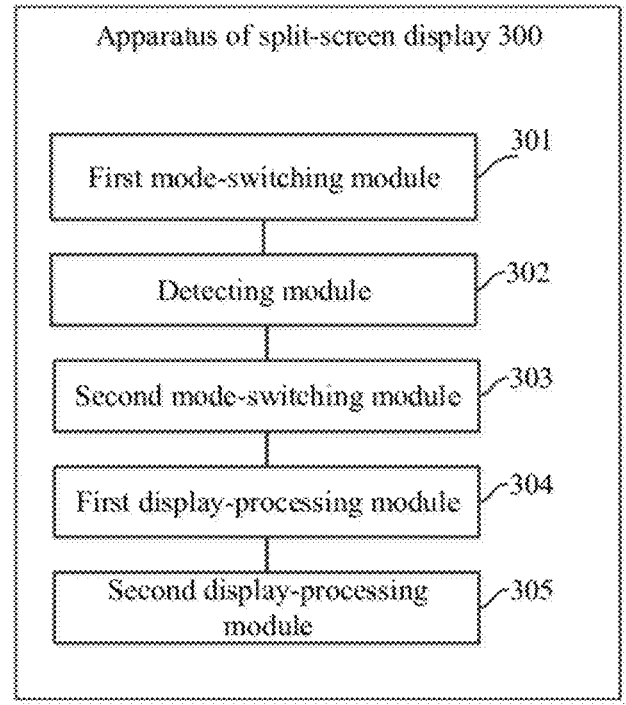
Fig. 5

Fig. 4C                                   Fig. 4D

METHOD AND APPARATUS FOR SPLIT-WINDOW DISPLAY

CROSS-REFERENCE TO RELATED APPLICATIONS

This application is based on and claims priority to Chinese Patent Application No. 201710200500.3 filed on Mar. 29, 2017, which is incorporated herein by reference in its entirety.

TECHNICAL FIELD

The present disclosure relates to computer technology, and more particularly to a method and apparatus for split-window display.

BACKGROUND

Electronic device loaded with a smart operating system supports foreground running of only a single application. In other words, on a display screen of the electronic device, only one application in a running state can be displayed.

SUMMARY

Examples of the disclosure provide method and apparatus for split-window display.

According to a first aspect of the disclosure, a method is provided. The method may include: entering a split-screen mode on a mobile terminal to display both a first display page for a first application and a second display page for a second application; detecting that an input mode for inputting information has been launched on the mobile terminal; determining whether the information is to be input in the first display page or the second display page.

The method may also include: switching to a first display mode on the terminal in response to determining that the information is to be input in the first display page, including: establishing a full-screen display for the first display page, and launching a floating window on the first display page to display the second display page in the floating window; and switching to a second display mode on the terminal in response to determining that the information is to be input in the second display page, including: establishing the full-screen display for the second display page, and launching the floating window on the second display page to display the first display page in the floating window.

According to a second aspect of the disclosure, a non-transitory computer readable storage medium is provided. The non-transitory computer readable storage medium may store instructions, and when the instructions are executed by a processor, may cause the processor to perform: entering a split-screen mode on a mobile terminal to display both a first display page for a first application and a second display page for a second application; detecting that an input mode for inputting information has been launched on the terminal; determining whether the information is to be input in the first display page or the second display page.

The instructions may further cause the processor to perform: switching to a first display mode on the terminal in response to determining that the information is to be input in the first display page, including: establishing a full-screen display for the first display page and launching a floating window on the first display page to display the second display page in the floating window; and switching to a second display mode on the terminal in response to determining that the information is to be input in the second display page, including: establishing the full-screen display for the second display page and launching the floating window on the second display page to display the first display page in the floating window.

According to a third aspect of the disclosure, a mobile terminal is provided. The mobile terminal may include comprises: a processor; and a memory for storing instructions executable by the processor. The processor may be configured to: enter a split-screen mode on the mobile terminal to display both a first display page for a first application and a second display page for a second application; detect that an input mode for inputting information has been launched on the mobile terminal; determine whether the information is to be input in the first display page or the second display page.

The processor may be further configured to: switch to a first display mode in response to determining that the information is to be input in the first display page by establishing a full-screen display for the first display page and launching a floating window on the first display page to display the second display page in the floating window; and switch to a second display mode in response to determining that the information is to be input in the second display page by establishing a full-screen display for the second display page and launching a floating window on the second display page to display the first display page in the floating window.

It is to be understood that both the forgoing general description and the following detailed description are exemplary and illustrative only, and are not restrictive of the present disclosure.

BRIEF DESCRIPTION OF THE DRAWINGS

The drawings are incorporated in, and formed a part of, the specification to show examples in conformity with the disclosure, and are for the purpose of illustrating the principles of the disclosure along with the specification.

FIG. 4A is an illustration of a split-screen display interface according to an example.

FIG. 4B is an illustration of multi-interface switching display according to an example.

FIGS. 4C and 4D are illustrations of interface display in which a user is performing a multi-interface operation according to an example.

FIG. 5 is a block diagram illustrating an apparatus of split-screen display according to an example.

Figure 1:
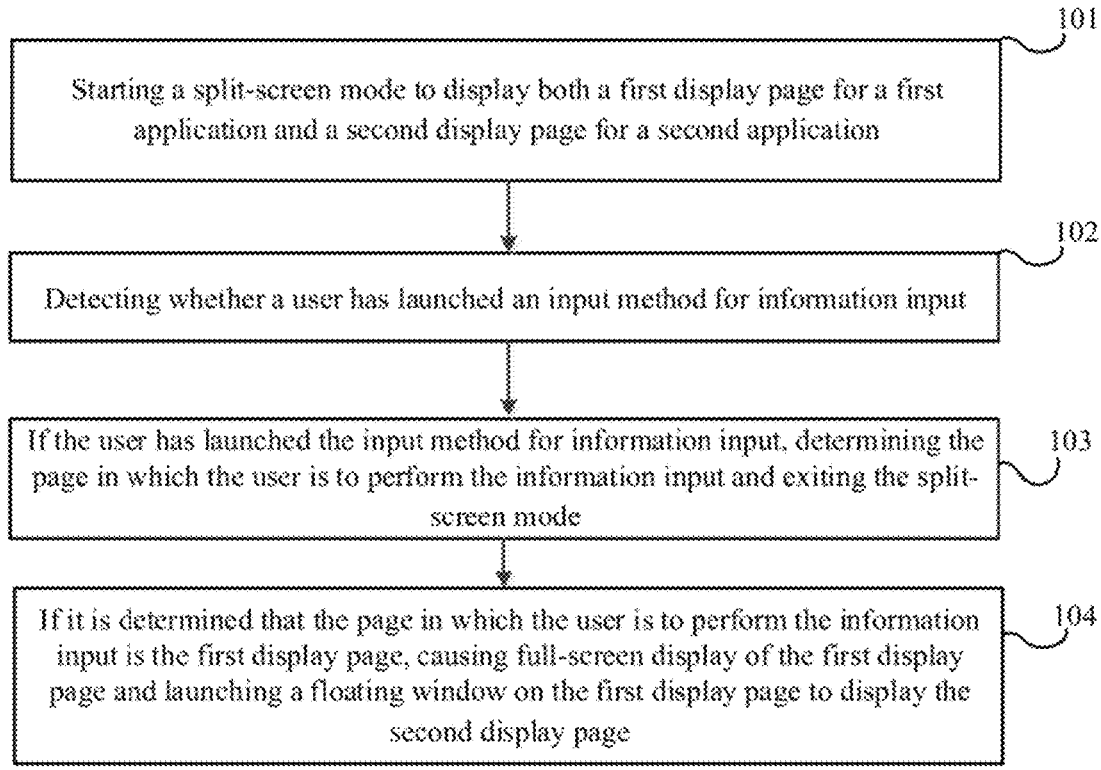
FIG. 1 is a flow chart showing a method of split-screen display according to an example.

The examples shown in the drawings mentioned above will be described in more detail in the following. The drawings and the literal description are by no means to limit the scope of the disclosure, but to illustrate to those skilled in the art the concept of the disclosure with reference to examples.

DETAILED DESCRIPTION

Reference will now be made in detail to examples, examples of which are illustrated in the accompanying drawings. The following description refers to the accompanying drawings in which same numbers in different drawings represent same or similar elements unless otherwise described. The implementations set forth in the following description of examples do not represent all implementations consistent with the disclosure. Instead, they are merely examples of apparatuses and methods consistent with aspects related to the disclosure as recited in the appended claims.

Terms used in the disclosure are only for description of particular examples, rather than intend to limit the disclosure. Singular form "a", "said" and "the" used in the disclosure and the appended claims also intend to include plural form, unless otherwise described distinctly in context. It is to be understood that the term "and/or" used in the disclosure refers to and includes any or all of possible combinations of one or more associated items listed.

It is to be understood that, although various information may be described using terms "first", "second", "third" and the like, the information is not limited to these terms. These terms are only used to distinguish the same kind of information from each other. For example, first information may be referred to as second information, and similarly, second information may be referred to as first information, without departing from the scope of the disclosure. For example, "if" as used herein, depending on the context, may be explained as "when . . . " or "in response to a determination that . . . ."

When a user needs to use two applications on a mobile device, he or she may have to switch back and forth the application that is foreground running. For instance, a user needs to use both application A that is foreground running and application B that is background running; if the user needs to view application B, he or she has to switch application A to background and application B to foreground, and when the user needs to view application A again, he or she has to switch application A back to foreground.

Solutions of split-window display are now available. In a split-window display mode, applications A and B can be both run at foreground for the user's view and operation.

As smart mobile terminal has a display screen of a small size, efficiency of operation may be affected if the user is to operate in an application that is being displayed in the split-window display mode.

The technical solutions provided by the examples of the disclosure are applied to mobile terminals, which may be, but is not limited to, various smart terminals with a small screen that can be operated via a touch screen, e.g. smart phone, tablet computer, personal digital assistant (PDA), among others. Those skilled in the art will appreciate that examples of the disclosure may be applied to any smart mobile terminal having a processor and a display output.

Reference will now be made to FIG. 1, which is a flow chart showing a method of split-screen display according to an example. The method is used for a smart mobile terminal and may include the following steps.

In step 101, a split-screen mode is started to display both a first display page for a first application and a second display page for a second application.

In step 102, it is detected whether a user has launched an input method for information input.

In step 103, if the user has launched the input method for information input, the page in which the user is to perform the information input is determined, and the split-screen mode is exited.

In step 104, if it is determined that the page in which the user is to perform the information input is the first display page, full-screen display of the first display page is caused and a floating window is launched on the first display page to display the second display page.

In step 105, if it is determined that the page in which the user is to perform the information input is the second display page, full-screen display of the second display page is caused and a floating window is launched on the second display page to display the first display page.

In summary, in the technical solution provided by the example, in a split-screen mode in which both a first display page for a first application and a second display page for a second application are displayed, if a user has launched an input method for information input, the page in which the user is to perform the information input is determined and the split-screen mode is exited; if it is determined that the page in which the user is to perform the information input is the first display page, full-screen display of the first display page is caused and a floating window is launched on the first display page to display the second display page; or if it is determined that the page in which the user is to perform the information input is the second display page, full-screen display of the second display page is caused and a floating window is launched on the second display page to display the first display page. It is possible to switch conveniently for split-window display and facilitate the user's input on a display page.

Reference will now be made to Ref. 2A, which is a flow chart showing a method of split-screen display according to an example. The method is used for a smart mobile terminal and may include the following steps.

In step 201, a split-screen mode is started to display both a first display page for a first application and a second display page for a second application.

In an example, starting the split-screen mode to display both the first display page for the first application and the second display page for the second application may comprise: receiving an operating signal for triggering display of a multitask management interface; retrieving applications that are running on the electronic device; and displaying the first display page for the first application in a primary zone of the multitask management interface and the second display page for the second application in a secondary zone of the multitask management interface, wherein the first application and the second application both are applications that are running on the electronic device.

Figure 3:
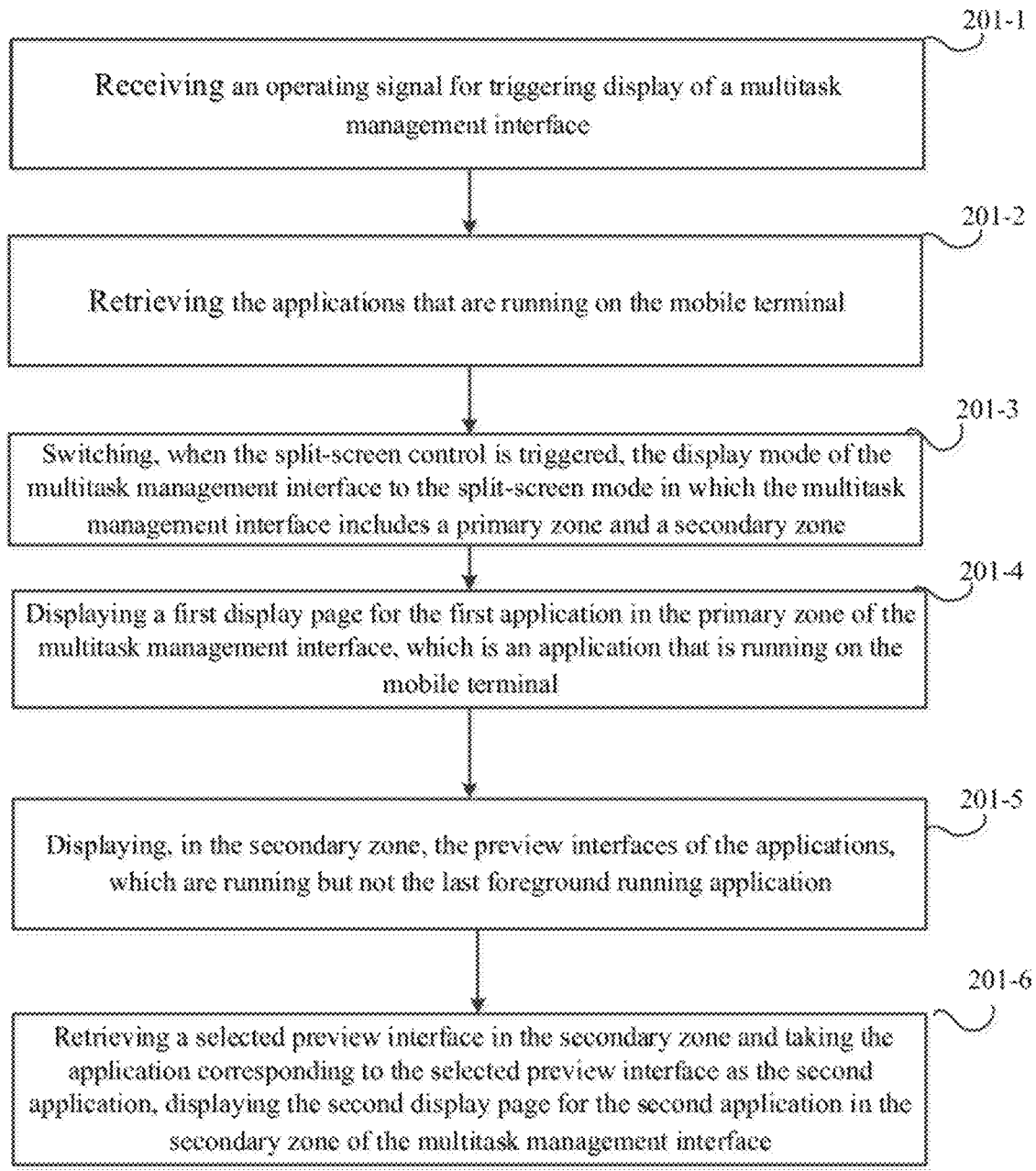
FIG. 3 is a flow chart showing a method of split-screen display of a plurality of applications according to an example.

FIG. 3 is a flow chart showing a method of split-screen display of a plurality of applications according to an example. With reference to FIG. 3, the starting the split-screen mode to display both the first display page for the first application and the second display page for the second application may comprise the following operations.

In step 201-1, an operating signal for triggering display of a multitask management interface is received.

The operating signal as used herein may be generated when a physical button on the mobile terminal is triggered, or a gesture that the user has inputted on the touch screen of the mobile terminal, or may be generated when the mobile terminal is shaken in accordance with a predetermined trajectory. The operating signal is not limited in the example and may be determined depending on practical circumstances.

In the example, as an example of operating signal, a physical button on the mobile terminal is triggered. For example, mobile terminal may include a multitask button for triggering display of a multitask management interface. When the user clicks the multitask button, an operating signal for triggering display of the multitask management interface is received at the mobile terminal.

The multitask management interface is generally used to display the applications that are running, and each of the applications may be displayed in the form of a preview interface of that application. The preview interface as used herein may be a page that was displayed on the display screen of the mobile terminal immediately before the application was exited from foreground running. Alternatively, the preview interface of an application may be the main interface of the application.

In step 201-2, the applications that are running on the electronic device are retrieved.

When the running applications are displayed in the multitask management interface, each of the applications may be displayed in the form of the preview interface of that application.

In particular, the preview interfaces of the applications may be displayed in various arrangements. For example, the preview interfaces of the applications may be displayed in a single horizontal row in a first predetermined order. As another example, the preview interfaces of the applications may be displayed in a single vertical column in the first predetermined order. The first predetermined order may be an order of time in which the applications were opened recently, or may be an order of frequency in which the applications were opened. The first predetermined order may be determined depending on practical circumstances, and is not limited herein.

Figure 2A:
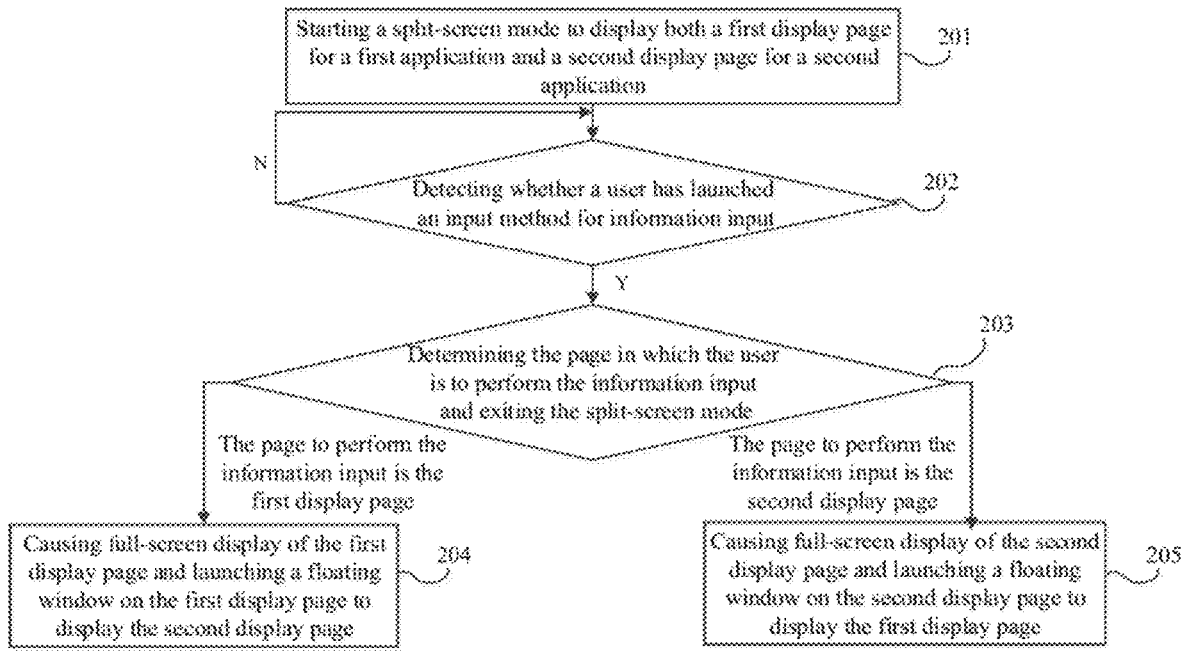
FIG. 2A is a flow chart showing a method of split-screen display according to an example.
Figure 2B:
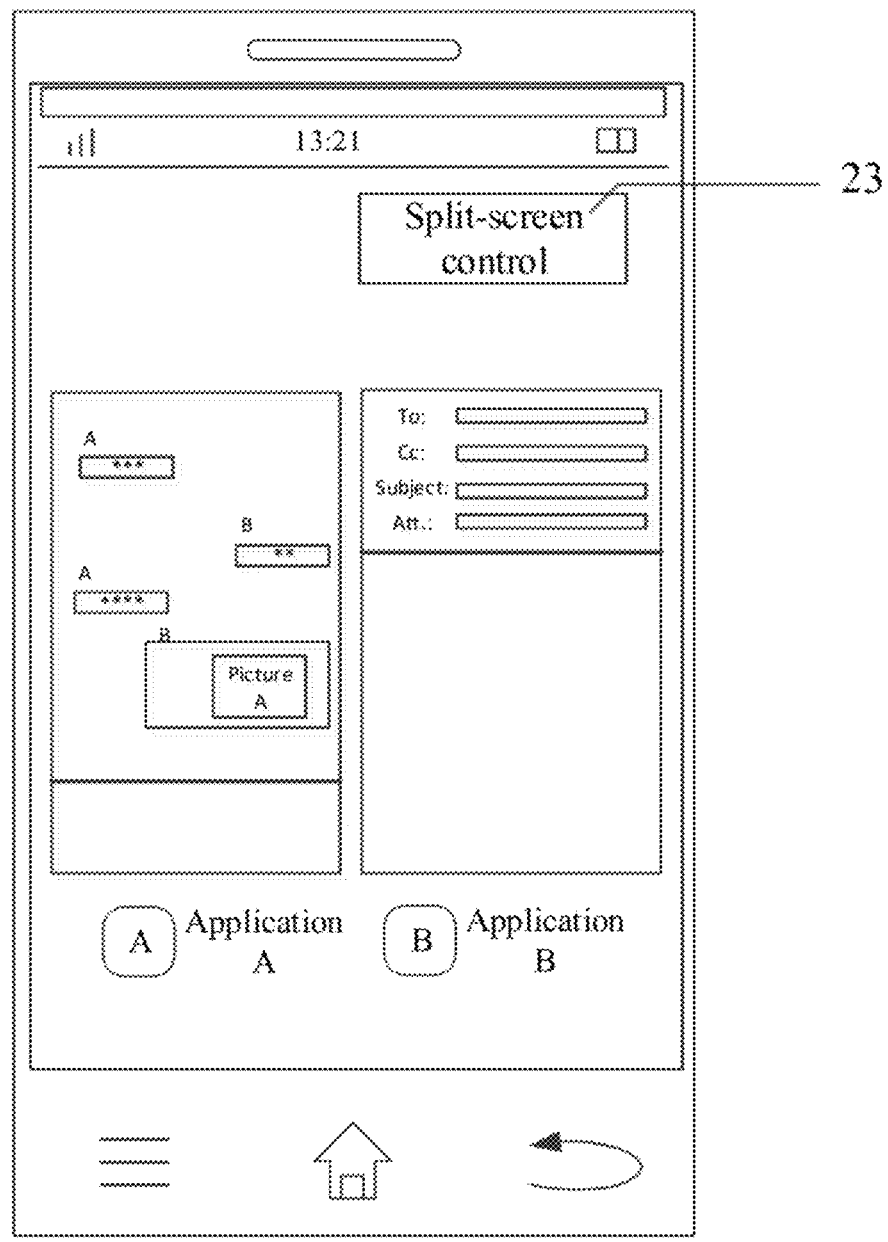
FIG. 2B is an illustration of a multitask display interface according to an example.

In particular, a split-screen control may be displayed on the multitask management interface and may be displayed at any place in the multitask management interface. In the example, as an example, the split-screen control is displayed at a top right corner in the multitask management interface. As shown in FIG. 2B, the split-screen control 23 is displayed at a top right corner in the multitask management interface.

Generally only a limited number of preview interfaces can be presented in the display screen of a mobile terminal. If a user needs to view the preview interfaces of more running applications, a predetermined gesture may be inputted to trigger the presentation of preview interfaces of more running applications. For example, the running applications include application A, application B and application C, and as shown in FIG. 2B, the preview interfaces of the applications are displayed in a single horizontal row. Due to the limited size of the display screen, application C is not displayed in the display screen. The user then may input a gesture of rightward swipe to trigger display of the preview interface of application C.

In step 201-3, when the split-screen control is triggered, the display mode of the multitask management interface is switched to the split-screen mode. In the split-screen mode, the multitask management interface includes a primary zone and a secondary zone.

Generally, displayed in the multitask management interface are the applications that are running and the split-screen control. When the split-screen control is triggered, the display mode of the multitask management interface is switched to the split-screen mode to divide the multitask management interface into a primary zone and a secondary zone.

It is to be noted that in the split-screen mode, the multitask management interface includes only one primary zone, but may include one or more secondary zones. In the example, as an example, the multitask management interface includes only one primary zone and one secondary zone. The method provided in the example may be referred to for the implementation in which the multitask management interface includes one primary zone and a plurality of secondary zones.

Figure 2C:
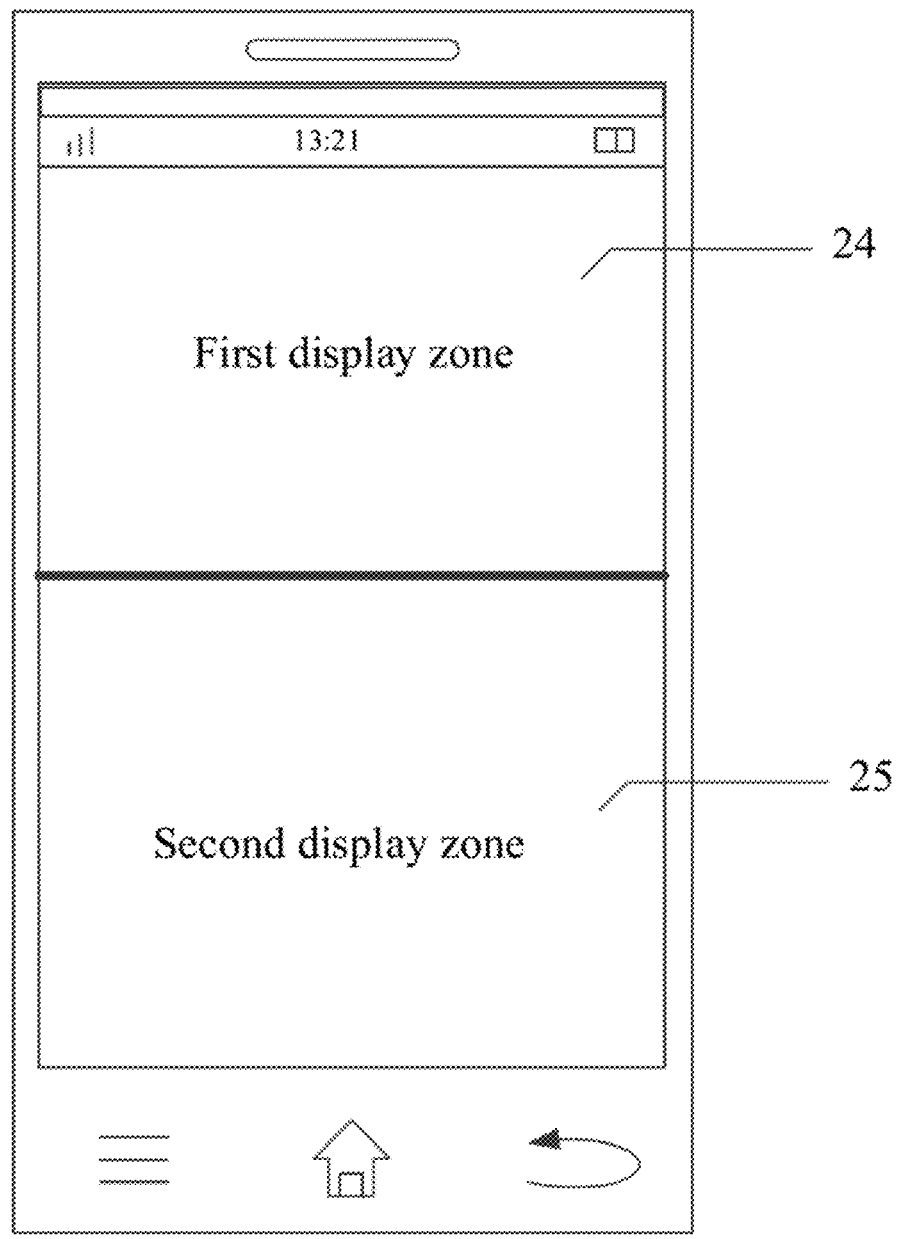
FIG. 2C is an illustration of a split-screen display interface according to an example.

FIG. 2C is a schematic showing a split-screen mode in which the multitask management interface includes only one primary zone 24 and one secondary zone 25. In other examples, in a split-screen mode the multitask management interface includes one primary zone and at least two secondary zones.

In step 201-4, a first display page for the first application is displayed in the primary zone of the multitask management interface, the first application being an application that is running on the mobile terminal.

The primary zone may be provided at any region within the multitask management interface, and may generally be provided at a place in the multitask management interface near the top of the display screen. For example, as shown in FIG. 2C, the primary zone 24 of the multitask management interface is displayed at the top of the display screen.

Display of the first application in the primary zone of the multitask management interface may be implemented by: retrieving the last foreground running application as the first application, and displaying the first display page of this first application in the primary zone of the multitask management interface.

For example, when application A is foreground running on the mobile terminal, the user triggers display of the multitask management interface by using the multitask button on the mobile terminal and clicks the split-screen control provided in the multitask management interface to switch the display mode of the multitask management interface to the split-screen mode. As shown in FIG. 2E, application A is taken as the first application and displayed in the primary zone 24 of the multitask management interface. The display page of application A may be the page that was displayed on the display screen of the mobile terminal immediately before application A was exited from foreground running, or may be the main interface of application A.

As another example, when no application is foreground running on the mobile terminal, the user triggers display of the multitask management interface by using the multitask button on the mobile terminal and clicks the split-screen control provided in the multitask management interface to switch the display mode of the multitask management interface to the split-screen mode. As shown in FIG. 2E, application A, the last foreground running application, is taken as the first application and displayed in the primary zone 24 of the multitask management interface. The display page of application A may be the page that was displayed on the display screen of the mobile terminal immediately before application A was exited from foreground running, or may be the main interface of application A.

In step 201-5, the preview interfaces of the applications, which are running but not the last foreground running application, are displayed in the secondary zone.

The preview interfaces of the applications may be displayed in the secondary zone in various arrangements. For example, the preview interfaces of the applications may be displayed in a single horizontal row in a second predetermined order. As another example, the preview interfaces of the applications may be displayed in a single vertical column in the second predetermined order. The second predetermined order may be an order of time in which the applications were opened recently, or may be an order of frequency in which the applications were opened. The second predetermined order may be determined depending on practical circumstances, and is not limited herein.

Figure 2D:
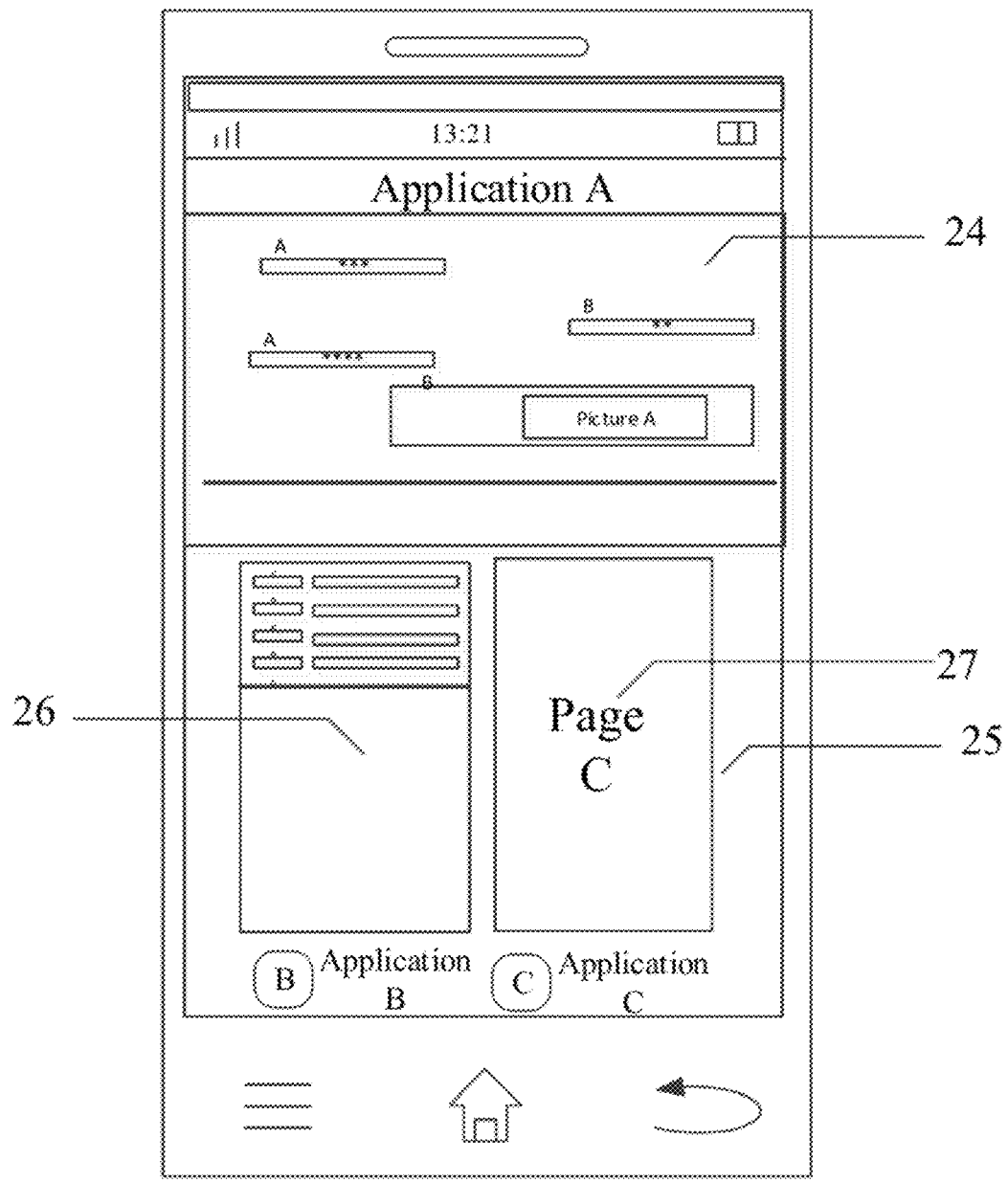
FIG. 2D is an illustration of a split-screen display interface according to an example.
Figure 2E:
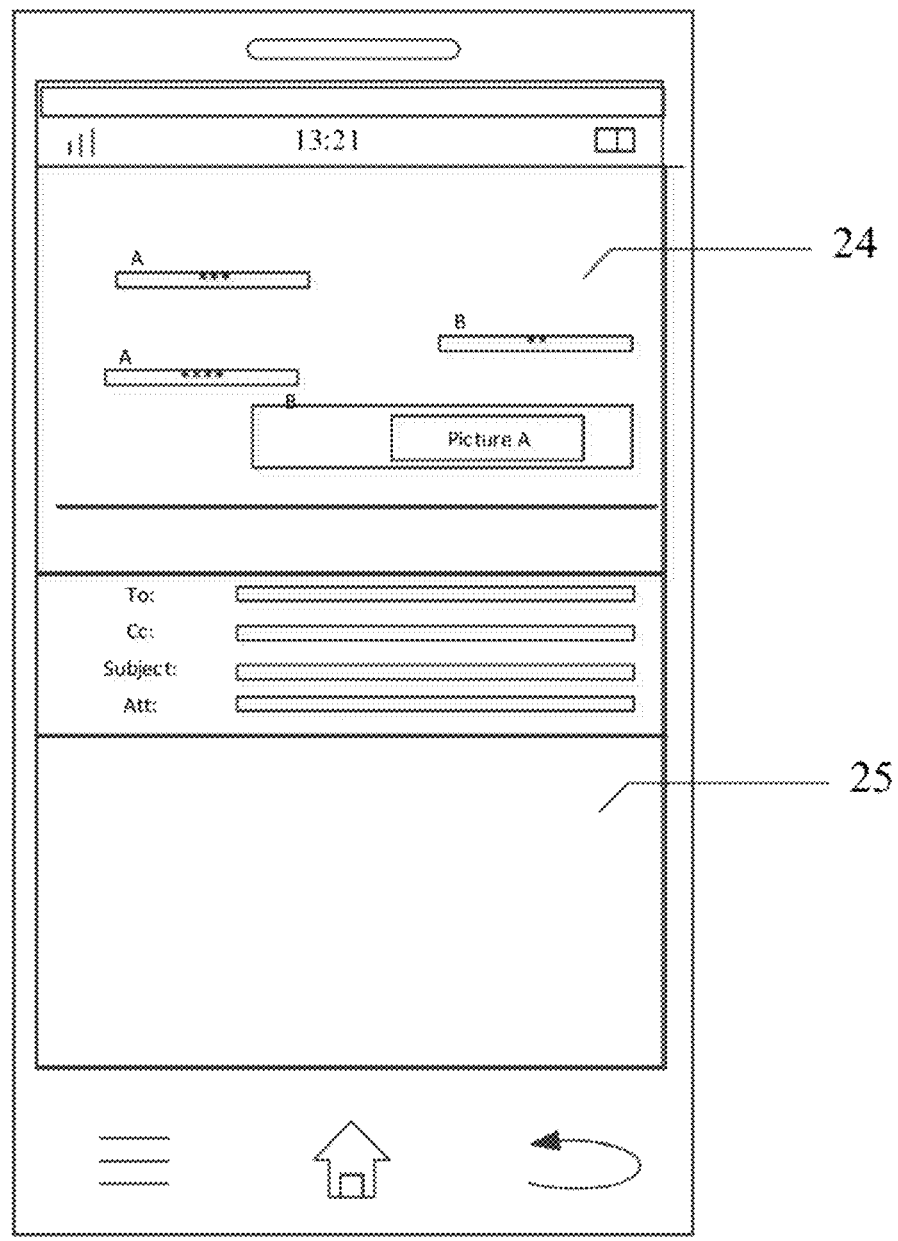
FIG. 2E is an illustration of a split-screen display interface according to an example.

For example, as shown in FIG. 2D, the last foreground running application is application A, and the applications running on the mobile terminal further include application B and application C. The preview interface 26 of application B and the preview interface 27 of application C are displayed in the secondary zone 25.

Generally only a limited number of preview interfaces can be presented in the secondary zone. If the user needs to view the preview interfaces of more running applications in the secondary zone, a predetermined gesture may be inputted to trigger the presentation of preview interfaces of more running applications.

In step 201-6, a selected preview interface in the secondary zone is retrieved and the application corresponding to the selected preview interface is taken as the second application. The second display page for the second application is displayed in the secondary zone of the multitask management interface.

Figure 2F:
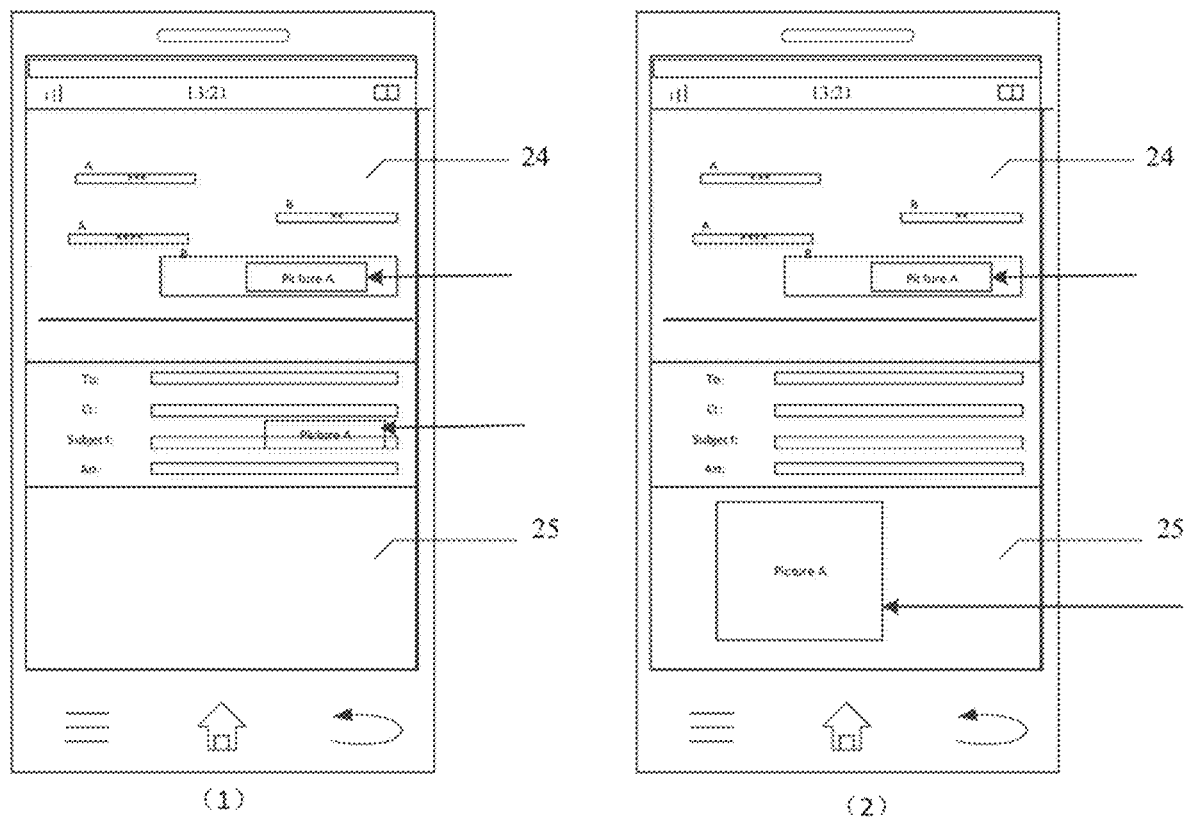
FIG. 2F is an illustration showing a content transmission process according to an example.

For example, as shown in FIG. 2D, the preview interface 26 of application B and the preview interface 27 of application C are displayed in the secondary zone 25. As shown in FIG. 2F(1) or (2), application B is taken as the second application and displayed in the secondary zone 25 of the multitask management interface, the preview interface of application B is presented.

It is to be noted that the first application displayed in the primary zone is foreground running and may be operated by the user; the second application displayed in the secondary zone is also foreground running and may be operated by the user. In other words, the first application displayed in the primary zone and the second application displayed in the secondary zone are both foreground running. For example, the user may use a video application displayed in the primary zone to view a video, and at the same time use a communication application in the secondary zone to chat with others.

With the method of split-screen display provided in the example, the operating signal for triggering display of the multitask management interface is received, the first application is displayed in the primary zone of the multitask management interface and the second application is displayed in the secondary zone of the multitask management interface, the first application and the second application both being applications that are running on the mobile terminal. By dividing the multitask management interface into the primary zone and the secondary zone to present different applications respectively, the user may use at least two different applications at the same time. The problem that applications are displayed monotonously on a mobile terminal can be solved and user experience can be improved.

In the split-screen display mode mentioned above, if a user sometime wants to operate in the display page of an application being displayed, for example perform an input operation in a communication application being displayed in the secondary zone, the following operations may be performed to further facilitate the user's operation in the page currently displayed.

In step 202, it is detected whether the user has launched an input method for information input.

Detecting whether the user has launched the input method may be done by querying whether an input method process is invoked by the application so that the user can input information using the input method. If the user has launched the input method for information input, step 203 is carried out; if the user has not launched the input method for information input, it is returned to step 202.

In step 203, the page in which the user is to perform the information input is determined, and the split-screen mode is exited.

Detecting the page in which the user is to perform the information input may be implemented by determining which page the focus of input cursor is in. If the page in which the user is to perform the information input is determined to be the first display page, step 204 is carried out. If the page in which the user is to perform the information input is determined to be the second display page, step 205 is carried out.

In step 204, full-screen display of the first display page is caused, and a floating window is launched on the first display page to display the second display page.

Here, causing full-screen display of the first display page and launching the floating window on the first display page to display the second display page may include: expanding the primary zone to full-screen to display the first display page, and shrinking the secondary zone to a predetermined size to form the floating window to display the second display page.

In an example, after expanding the primary zone to full-screen to display the first display page and shrinking the secondary zone to the predetermined size to form the floating window to display the second display page, the size and location of the floating window for displaying the second display page may be adjusted with the progress of the information input in the first display page. For example, the floating window may be scaled down and may be moved to ensure the information input in the first display page and display of the conversation information while the user is still able to view the second display page in the floating window.

In step 205, full-screen display of the second display page is caused, and a floating window is launched on the second display page to display the first display page.

Here, causing full-screen display of the second display page and launching the floating window on the second display page to display the first display page may include: expanding the secondary zone to full-screen to display the second display page, and shrinking the primary zone to a predetermined size to form the floating window to display the first display page.

In an example, after expanding the secondary zone to full-screen to display the second display page and shrinking the primary zone to the predetermined size to form the floating window to display the first display page, the size and location of the floating window for displaying the first display page may be adjusted with the progress of the information input in the second display page. For example, the floating window may be scaled down and may be moved to ensure the information input in the second display page and display of the conversation information while the user is still able to view the first display page in the floating window.

In this technical solution, the method may further include: detecting whether the user has ended the information input; and if the user has ended the information input, starting the split-screen mode to display both the first display page for the first application and the second display page for the second application.

In the following, an implementation of the technical solution will be described in connection with a specific scenario.

With reference to FIG. 4A which provides an illustration of a split-screen display interface according to the example, a split-screen mode is started to display both a video playing page for a video application and a conversation page for a chat application. As shown in FIG. 4A, the video playing page is displayed at the upper half of the interface currently displayed, and the conversation page is displayed at the lower half of the interface currently displayed.

With reference to FIG. 4B which provides an illustration of multi-interface switching display according to an example. Based on the display interface shown in FIG. 4A, it is detected whether a user has launched an input method for information input, and the page in which the user is to perform the information input is determined. If it is detected that the page the user is to input is the conversation page, the split-screen display mode is exited, the conversation page is expanded to full-screen, and the video playing page is shrunk to display the video playing page in the form of a floating window, as shown in FIG. 4B.

With reference to FIGS. 4C and 4D, which provide illustrations of interface display in which a user is performing a multi-interface operation according to an example. After exiting the split-screen display mode, expanding the conversation page to full-screen, and shrinking the video playing page to display the video playing page in the form of a floating window, the user performs information input in the conversation page. A soft keyboard for input is launched and displayed for the user's information input. In order to facilitate the user's information input and display of the relevant information inputted, the size and location of the video playing page in the form of the floating window may be dynamically adjusted. For example, the location where it is displayed may be moved, and the window may be scaled down, as shown in FIGS. 4C and 4D.

If the user has ended the information input in the conversation page, the split-screen display mode may be restarted to display both the video playing page and the conversation page at the upper and lower zones of the cellphone screen, as shown in FIG. 4A.

With the technical solution, in a split-screen mode in which both a first display page for a first application and a second display page for a second application are displayed, if a user has launched an input method for information input, the page in which the user is to perform the information input is determined and the split-screen mode is exited; if it is determined that the page in which the user is to perform the information input is the first display page, full-screen display of the first display page is caused and a floating window is launched on the first display page to display the second display page; or if it is determined that the page in which the user is to perform the information input is the second display page, full-screen display of the second display page is caused and a floating window is launched on the second display page to display the first display page. It is possible to switch conveniently for split-window display and facilitate the user's input on a display page.

An example of an apparatus will be described in the following which may be used to carry out the examples of the methods of the disclosure. Details that are not described for the example of apparatus may be found with reference to the examples of methods of the disclosure.

FIG. 5 is a block diagram illustrating an apparatus 300 of split-screen display according to an example. The apparatus 300 of split-screen display may be implemented in software, hardware or a combination of both, into a part or the whole of a mobile terminal. The mobile terminal may be, but is not limited to, various smart terminals with a small screen that can be operated via a touch screen, e.g. smart phone, tablet computer, personal digital assistant (PDA), among others. Those skilled in the art will appreciate that the example of the disclosure may be applied to any smart mobile terminal having a processor and a display output. The apparatus 300 of split-screen display may include: a first mode-switching module 301 configured to start a split-screen mode to display both a first display page for a first application and a second display page for a second application; a detecting module 302 which may be configured to detect whether a user has launched an input method for information input; a second mode-switching module 303 which may be configured to, if the user has launched the input method for information input, determine the page in which the user is to perform the information input and exit the split-screen mode; and a first display-processing module 304 which may be configured to, if it is determined that the page in which the user is to perform the information input is the first display page, cause full-screen display of the first display page and launch a floating window on the first display page to display the second display page; or a second display-processing module 305 which may be configured to, if it is determined that the page in which the user is to perform the information input is the second display page, cause full-screen display of the second display page and launch a floating window on the second display page to display the first display page.

In an example, the detecting module 302 may be further configure to detect whether the user has ended the information input; and the first mode-switching module 301 may be further configured to, if the user has ended the information input, start the split-screen mode to display both the first display page for the first application and the second display page for the second application.

Figure 6:
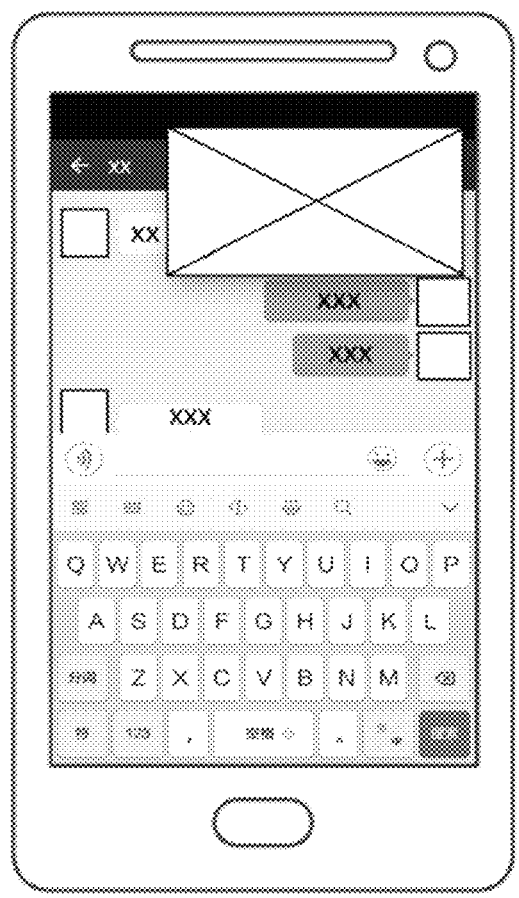
FIG. 6 is a block diagram illustrating a first mode-switching module in FIG. 5 according to an example.
Figure 6:
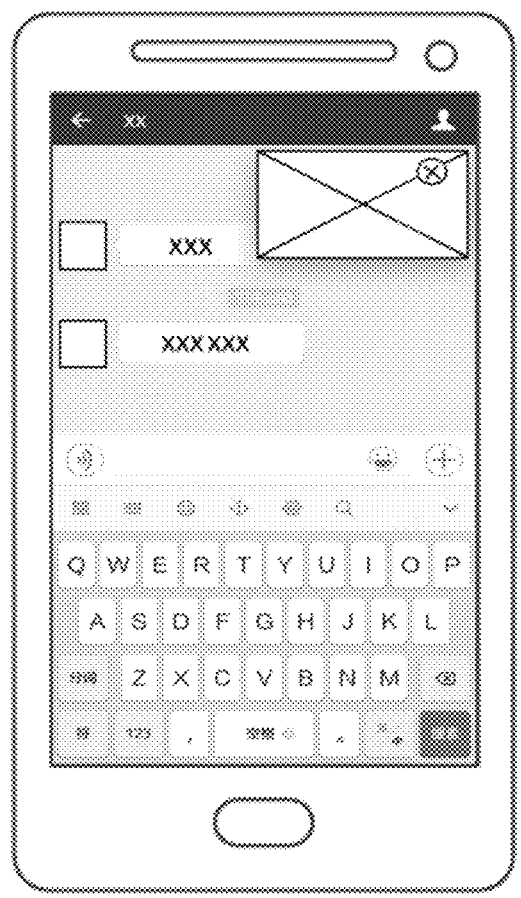
Figure 6:
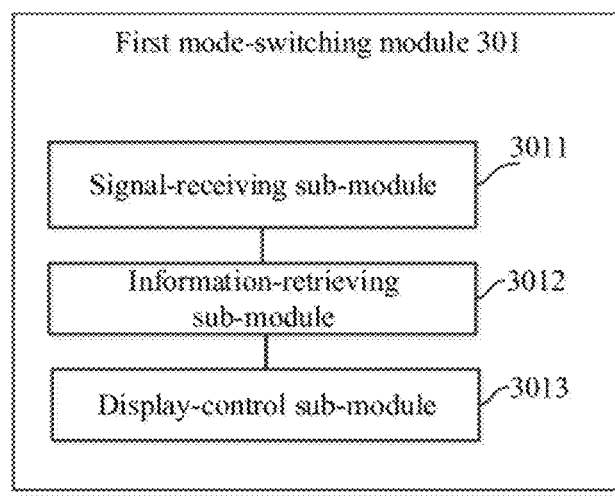

With reference to FIG. 6, the first mode-switching module 301 shown in FIG. 5 may include: a signal-receiving sub-module 3011 which may be configured to receive an operating signal for triggering display of a multitask management interface; an information-retrieving sub-module 3012 which may be configured to retrieve applications that are running on the electronic device; and a display-control sub-module 3013 which may be configured to display the first display page for the first application in a primary zone of the multitask management interface and the second display page for the second application in a secondary zone of the multitask management interface, wherein the first application and the second application both are applications that are running on the electronic device.

In an example, the first display-processing module 304 may be configured to expand the primary zone to full-screen to display the first display page, and shrink the secondary zone to a predetermined size to form the floating window to display the second display page.

With the technical solutions provided herein, in a split-screen mode in which both a first display page for a first application and a second display page for a second application are displayed, if a user has launched an input method for information input, the page in which the user is to perform the information input is determined and the split-screen mode is exited; if it is determined that the page in which the user is to perform the information input is the first display page, full-screen display of the first display page is caused and a floating window is launched on the first display page to display the second display page; or if it is determined that the page in which the user is to perform the information input is the second display page, full-screen display of the second display page is caused and a floating window is launched on the second display page to display the first display page. It is possible to switch conveniently for split-window display and facilitate the user's input operation on a display page.

With respect to the apparatuses of the examples, the manners in which the modules carry out the operations have been described in the examples of the methods, and will not be detailed here.

Figure 7:
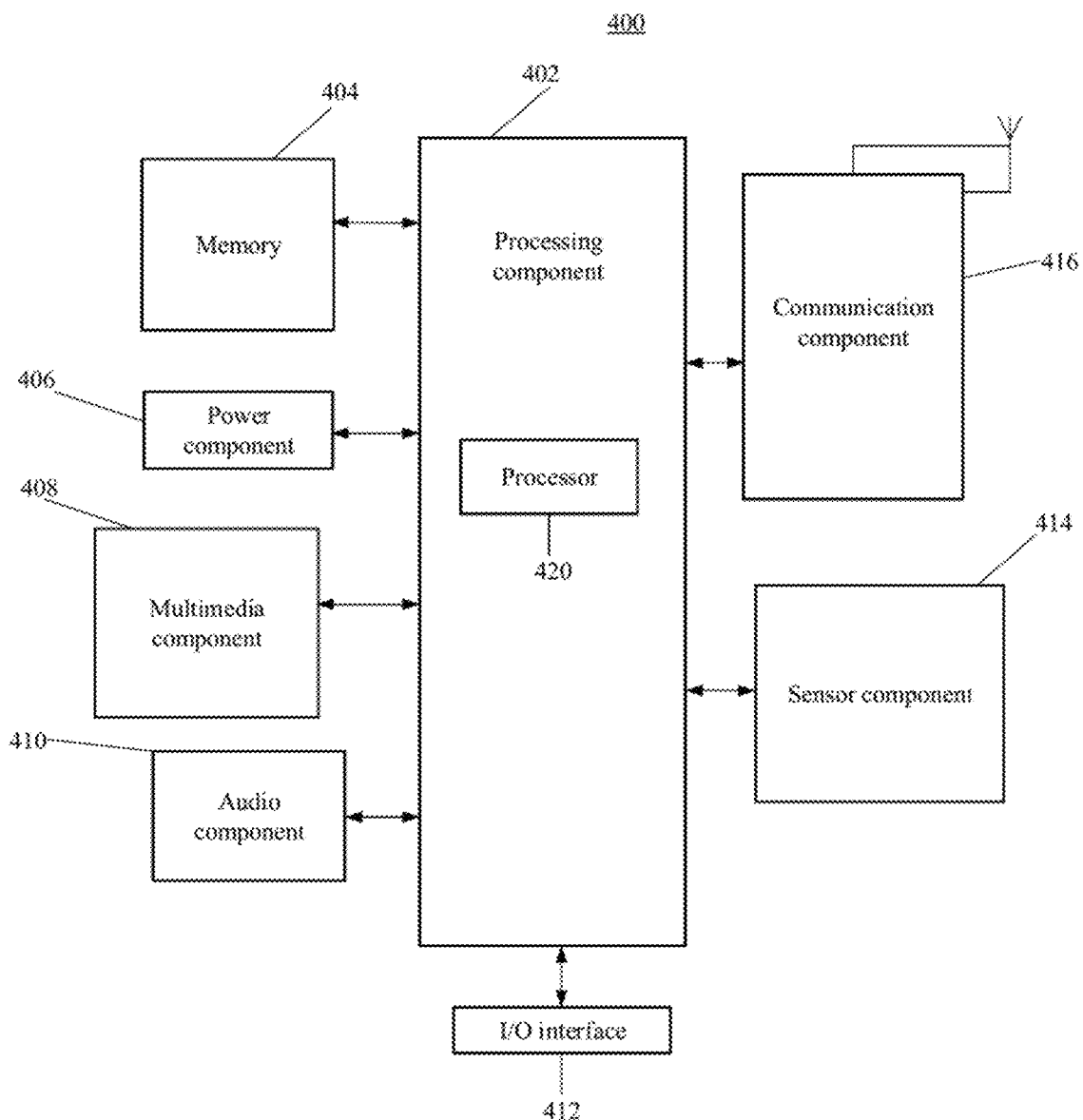
FIG. 7 is a block diagram illustrating an apparatus of split-screen display according to an example.

FIG. 7 is a block diagram illustrating an apparatus 400 of split-screen display according to an example. For example, the apparatus 400 may be, but is not limited to, various smart terminals with a small screen that can be operated via a touch screen, e.g. smart phone, tablet computer, personal digital assistant (PDA), among others.

Referring to FIG. 7, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 generally controls overall operations of the apparatus 400, such as the operations associated with display, telephone calls, data communications, camera operations, and recording operations. The processing component 402 may include one or more processors 420 to execute instructions to perform all or part of the steps in the above described methods of split-screen display. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation on the apparatus 400. Examples of such data include instructions for any applications or methods operated on the apparatus 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may include a power management system, one or more power sources, and any other components associated with the generation, management, and distribution of power for the apparatus 400.

The multimedia component 408 includes a screen providing an output interface between the apparatus 400 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 408 includes a front camera and/or a rear camera. The front camera and the rear camera may receive an external multimedia datum while the apparatus 400 is in an operation mode, such as a photographing mode or a video mode. Each of the front camera and the rear camera may be a fixed optical lens system or have optical focusing and zooming capability.

The audio component 410 is configured to output and/or input audio signals. For example, the audio component 410 includes a microphone ("MIC") configured to receive an external audio signal when the apparatus 400 is in an operation mode, such as a call mode, a recording mode, and a voice recognition mode. The received audio signal may be further stored in the memory 404 or transmitted via the communication component 416. In some examples, the audio component 410 further includes a speaker to output audio signals.

The I/O interface 412 provides an interface between the processing component 402 and peripheral interface modules, the peripheral interface modules being, for example, a keyboard, a click wheel, buttons, and the like. The buttons may include, but are not limited to, a home button, a volume button, a starting button, and a locking button.

The sensor component 414 includes one or more sensors to provide status assessments of various aspects of the apparatus 400. For instance, the sensor component 414 may detect an open/closed status of the apparatus 400, relative positioning of components (e.g., the display and the keypad, of the apparatus 400), a change in position of the apparatus 400 or of a component of the apparatus 400, a presence or absence of user contact with the apparatus 400, an orientation or an acceleration/deceleration of the apparatus 400, and a change in temperature of the apparatus 400. The sensor component 414 may include a proximity sensor configured to detect the presence of a nearby object without any physical contact. The sensor component 414 may also include a light sensor, such as a CMOS or CCD image sensor, for use in imaging applications. In some examples, the sensor component 414 may also include an accelerometer sensor, a gyroscope sensor, a magnetic sensor, a pressure sensor, or a temperature sensor.

The communication component 416 is configured to facilitate communication, wired or wirelessly, between the apparatus 400 and other devices. The apparatus 400 can access a wireless network based on a communication standard, such as WiFi, 2G, or 3G, or a combination thereof. In an example, the communication component 416 receives a broadcast signal or broadcast associated information from an external broadcast management system via a broadcast channel. In an example, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods of interface switching.

In examples, also provided is a non-transitory computer-readable storage medium including instructions, such as included in the memory 404, executable by the processor 420 in the apparatus 400, for performing the above-described methods of split-screen display. For example, the non-transitory computer-readable storage medium may be a ROM, a random access memory (RAM), a CD-ROM, a magnetic tape, a floppy disc, an optical data storage device, and the like.

The disclosure provides a non-transitory computer readable storage medium having stored therein instructions that, when executed by the processor of the apparatus 400, cause the apparatus 400 to perform the above described methods of split-screen display.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method, comprising:
    entering a split-screen mode on a mobile terminal to display both a first display page for a first application and a second display page for a second application;
    detecting that an input mode for inputting information has been launched by querying whether an input method process is invoked on the mobile terminal, wherein the input method process invokes a soft keyboard for inputting information;
    determining whether the information is to be input by the detected input mode in the first display page or the second display page;
    switching to a first display mode on the terminal in response to determining that the information is to be input in the first display page, comprising:
        establishing a full-screen display for the first display page, and
        launching a floating window on the first display page to display the second display page in the floating window, wherein the second display page is shrunk to a predetermined size on the floating window while the first display page is displayed on the full-screen display, and wherein the floating window to display the second display page is launched when the information is to be input on the first display page and the split-screen mode exits; and
    switching to a second display mode on the terminal in response to determining that the information is to be input in the second display page, comprising:
        establishing the full-screen display for the second display page, and
        launching the floating window on the second display page to display the first display page in the floating window, wherein the first display page is shrunk to a predetermined size on the floating window while the second display page is displayed on the full-screen display, and wherein the floating window to display the first display page is launched when the information is to be input on the second display page and the split-screen mode exits.

2. The method of claim 1, further comprising:
    detecting whether the information has been input; and
    switching, in response to detecting that the information has been input, to the split-screen mode to display both the first display page for the first application and the second display page for the second application.

3. The method of claim 1, wherein entering the split-screen mode comprises:
    receiving an operating instruction for triggering display of a multitask management interface;
    retrieving applications that are running on the mobile terminal; and
    displaying the first display page for the first application in a primary zone of the multitask management interface and displaying the second display page for the second application in a secondary zone of the multitask management interface, wherein the first application and the second application are both running on the mobile terminal.

4. The method of claim 3, wherein switching to the first display mode comprises:
    expanding the primary zone to the full-screen display for the first display page, and shrinking the secondary zone to a predetermined size to form the floating window to display the second display page in the floating window.

5. The method of claim 3, wherein switching to the second display mode comprises:
    expanding the secondary zone to the full-screen display for the second display page, and shrinking the primary zone to a predetermined size to form the floating window to display the first display page in the floating window.

6. A non-transitory computer readable storage medium having instructions stored thereon which, when executed by a processor, cause the processor to perform:
    entering a split-screen mode on a mobile terminal to display both a first display page for a first application and a second display page for a second application;
    detecting that an input mode for inputting information has been launched by querying whether an input method process is invoked on the terminal, wherein the input method process invokes a soft keyboard for inputting information;

determining whether the information is to be input by the detected input mode in the first display page or the second display page; and switching to a first display mode on the terminal in response to determining that the information is to be input in the first display page, comprising:
- establishing a full-screen display for the first display page; and
- launching a floating window on the first display page to display the second display page in the floating window, wherein the second display page is shrunk to a predetermined size on the floating window while the first display page is displayed on the full-screen display, and wherein the floating window to display the second display page is launched when the information is to be input on the first display page and the split-screen mode exits; and switching to a second display mode on the terminal in response to determining that the information is to be input in the second display page, comprising:
- establishing the full-screen display for the second display page, and
- launching the floating window on the second display page to display the first display page in the floating window, wherein the first display page is shrunk to a predetermined size on the floating window while the second display page is displayed on the full-screen display, and wherein the floating window to display the second display page is launched when the information is to be input on the first display page and the split-screen mode exits.

7. The non-transitory computer readable storage medium of claim 6, wherein the instructions further cause the processor to perform:
- detecting whether the information has been input; and
- switching, in response to detecting that the information has input, to the split-screen mode to display both the first display page for the first application and the second display page for the second application.

8. The non-transitory computer readable storage medium of claim 6, wherein the instructions caused the processor to perform entering the split-screen mode further cause the processor to perform:
- receiving an operating instruction for triggering display of a multitask management interface;
- retrieving applications that are running on the mobile terminal; and
- displaying the first display page for the first application in a primary zone of the multitask management interface and displaying the second display page for the second application in a secondary zone of the multitask management interface, wherein the first application and the second application are both running on the mobile terminal.

9. The non-transitory computer readable storage medium of claim 8, wherein the instructions caused the processor to perform switching to the first display mode further cause the processor to perform: expanding the primary zone to the full-screen display for the first display page, and shrinking the secondary zone to a predetermined size to form the floating window to display the second display page in the floating window.

10. The non-transitory computer readable storage medium of claim 8, wherein the instructions caused the processor to perform switching to the second display mode further cause the processor to perform: expanding the secondary zone to the full-screen display for the second display page, and shrinking the primary zone to a predetermined size to form the floating window to display the first display page in the floating window.

11. The non-transitory computer readable storage medium of claim 8, wherein the instructions caused the processor to perform entering the split-screen mode further cause the processor to perform: displaying a third display page for a third application in the secondary zone in addition to the second display page.

12. The non-transitory computer readable storage medium of claim 11, wherein the second application and the third application are displayed in an order of time in which they are opened recently.

13. The non-transitory computer readable storage medium of claim 11, wherein the second application and the third application are displayed in an order of frequency in which they are opened.

14. The non-transitory computer readable storage medium of claim 11, wherein the instructions further cause the processor to perform: displaying a display page for a further application in the secondary zone in response to receiving a predetermined gesture.

15. The non-transitory computer readable storage medium of claim 6, wherein, whether the information is to be input in the first display page or the second display page is determined based on a location of focus of an input cursor.

16. A mobile terminal, comprising:
- a processor; and
- a memory for storing instructions executable by the processor,
- wherein the processor, when executes the instructions, is configured to:
- enter a split-screen mode on the mobile terminal to display both a first display page for a first application and a second display page for a second application;
- detect that an input mode for inputting information has been launched by querying whether an input method process is invoked on the mobile terminal, wherein the input method process invokes a soft keyboard for inputting information;
- determine whether the information is to be input by the detected input mode in the first display page or the second display page;
- switch to a first display mode in response to determining that the information is to be input in the first display page by establishing a full-screen display for the first display page and launching a floating window on the first display page to display the second display page in the floating window, wherein the second display page is shrunk to a predetermined size on the floating window while the first display page is displayed on the full-screen display, and wherein the floating window to display the second display page is launched when the information is to be input on the first display page and the split-screen mode exits; and
- switch to a second display mode in response to determining that the information is to be input in the second display page by establishing a full-screen display for the second display page and launching a floating window on the second display page to display the first display page in the floating window, wherein the first display page is shrunk to a predetermined size on the floating window while the second display page is displayed on the full-screen display, and wherein the floating window to display the first display page is launched when the information is to be input on the second display page and the split-screen mode exits.

17. The mobile terminal of claim 16, wherein the processor is further configured to:
    detect whether the information has been input; and
    switch, in response to detecting that the information has been input, to the split-screen mode to display both the first display page for the first application and the second display page for the second application.

18. The mobile terminal of claim 16, wherein the processor is configured to:
    receive an operating instruction for triggering display of a multitask management interface;
    retrieve applications that are running on the mobile terminal; and
    display the first display page for the first application in a primary zone of the multitask management interface and display the second display page for the second application in a secondary zone of the multitask management interface, wherein the first application and the second application are both running on the mobile terminal.

19. The mobile terminal of claim 18, wherein the processor is configured to:
    expand the primary zone to the full-screen display for the first display page, and shrink the secondary zone to a predetermined size to form the floating window to display the second display page in the floating window.

20. The mobile terminal of claim 18, wherein the processor is configured to:
    expand the secondary zone to the full-screen display for the second display page, and shrink the primary zone to a predetermined size to form the floating window to display the first display page in the floating window.

* * * * *